US006846242B1

(12) United States Patent
Rivera et al.

(10) Patent No.: US 6,846,242 B1
(45) Date of Patent: Jan. 25, 2005

(54) UNIVERSAL JOINT ASSEMBLY

(76) Inventors: Lazaro Rivera, 491 SE. 19 Ave., Pompano, FL (US) 33060; Ruben Arrieta, 837 SW. 118 Ter., Davie, FL (US) 33325

( * ) Notice: Subject to any disclaimer, the term of this patent is extended or adjusted under 35 U.S.C. 154(b) by 0 days.

(21) Appl. No.: 10/227,787

(22) Filed: Aug. 26, 2002

(51) Int. Cl.[7] .................................................. F16D 3/16
(52) U.S. Cl. ....................................... 464/136; 464/112
(58) Field of Search ........................... 464/11, 112, 136, 464/133, 185, 905; 403/57, 58, 74

(56) References Cited

U.S. PATENT DOCUMENTS

| 1,121,144 | A | * | 12/1914 | Sponsel ...................... 464/134 |
|---|---|---|---|---|
| 1,826,611 | A | * | 10/1931 | Furgason ...................... 464/11 |
| 1,918,613 | A | * | 7/1933 | Peters .......................... 464/14 |
| 2,876,636 | A | * | 3/1959 | Thackeray .................... 464/14 |
| 3,213,644 | A | * | 10/1965 | Murphy ........................ 464/11 |
| 5,267,904 | A | * | 12/1993 | Geisthoff ..................... 464/136 |
| 5,326,322 | A | * | 7/1994 | Fechter ......................... 464/11 |

* cited by examiner

Primary Examiner—David Bagnell
Assistant Examiner—K. Thompson
(74) Attorney, Agent, or Firm—Malloy & Malloy, P.A.

(57) ABSTRACT

A universal joint assembly including a cruciform or like structured body having a plurality of spaced apart bores formed therein and a plurality of trunnion pins each rotationally mounted within different ones of the plurality of bores. A retaining assembly movably engages and retains an inner portion of the plurality of trunnion pins. Rotation of each of the trunnion pins relative to the body eliminates the need for any type of bearing assembly being interconnected or otherwise disposed between an outer end of the trunnion pins and interconnected yokes or like cooperative, exterior components conventionally associated with a universal joint assembly.

18 Claims, 3 Drawing Sheets

UNIVERSAL JOINT ASSEMBLY

BACKGROUND OF THE INVENTION

1. Field of the Invention

The present invention is directed to a universal joint assembly and more particularly to the body and a trunnion assembly thereof. The trunnion assembly comprises a plurality of trunnion pins rotationally mounted on the body, thereby eliminating the need for interconnecting bearing assemblies typically used to pivotally interconnect bifurcated yokes of associated rotary axles or shafts, in a conventional manner.

2. Description of the Related Art

Universal joints are well known and find a primary field of use in interconnecting drive line components of motor vehicles. More specifically, universal joints are conventionally used to interconnect a pair of rotary shafts or axles in a manner which permits both rotational and relative pivotal motion of the connected shafts. Typically, universal joints include or are associated with two bifurcated yokes each of which are secured to a corresponding end of one of the rotary axles or shafts being interconnected. Relative pivotal interconnection of the yokes to one another is accomplished by the body of the universal joint, commonly referred to as a spider or cruciform, including a plurality of fixedly attached, orthogonally oriented trunnions.

Axially aligned ones of the plurality of trunnions define a trunnion pair which are connected within apertures formed in the spaced apart legs of the bifurcated yokes. In the conventional design and structuring of a universal joint, a bearing assembly which may include a plurality of needle bearings or structurally equivalent bearings are arranged in a bearing retainer. The aforementioned bearing assemblies serve to interconnect individual ones of the trunnions to the opposite legs of each of the yokes in order to facilitate pivotal movement of the yokes relative to the corresponding trunnion pairs.

The bearing assembly used to pivotally interconnect the individual trunnions to the corresponding yokes specifically includes the use of integrally formed grooves, washers, snap rings and other connectors to maintain the bearing assembly in place. However, it is well recognized that regardless of the various attempts to structurally retain and/or interconnect the aforementioned bearing assemblies in their operative position, various disadvantages and problems exist. Such problems include, but are not necessarily limited to, a relatively short operable life and high cost of manufacture of the bearing assemblies as well as a frequent failure of the bearing retainers.

In addition the existence of dimensional variations can exist, which frequently results in an excess clearance between the bearing assembly and the retaining structure maintaining the bearing in its operative position. Further, any resulting gap existing between the trunnions and the bearing assembly itself results in a noticeable unstable rotational and pivotal motion between the interconnected rotary axles or shafts. Accordingly, the smooth and effective transfer of torque between the two rotary shafts or axles associated with the interconnected yokes frequently becomes impossible.

Even in light of the above noted problems in unstable torque transfer and the tendency of various portions of the bearing assembly and/or the retaining connectors associated therewith to fail, there have been relatively little major advancements in the structural or operative modification of the primary components of the universal joint. Instead, advancements to overcome the above noted problems have concentrated on design improvements of the bearing assemblies, retaining structures associated therewith and/or the design of the individual needle bearings or other bearing structures used to accomplish the aforementioned pivotal interconnection.

Accordingly, there is a significant need for a universal joint assembly which is structurally unique and functionally efficient to accomplish the transfer of torque between rotary shafts while allowing relative, pivotal or angular movement therebetween. Such an improved universal joint assembly should be uniquely structured to eliminate the need for any type of bearing assembly for pivotally interconnecting the spaced apart, opposed legs of a yoke to the respective, axially oriented trunnions. Instead unique structural modifications of such an improved universal joint assembly would include rotationally securing a trunnion assembly, comprising a plurality of orthogonally oriented trunnion pins, to the body. As such the relative pivotal movement between interconnected rotary shafts could be accomplished by rotation of individual trunnion pins relative to the body, rather than by pivotal or rotational movement of the yokes of the shafts relative to the trunnion assembly, by means of the aforementioned bearing structures. Therefore, commonly recognized disadvantages and problems of the type set forth above would be substantially eliminated.

Additional structural modifications of such an improved universal joint assembly could further include the reinforcement of the cruciform body so as to eliminate or significantly restrict the possibility of flexure occurring between adjacently positioned trunnions during applications of relatively excessive force being applied to the body and trunnion assembly.

SUMMARY OF THE INVENTION

The present invention is directed to a universal joint assembly and more particularly to the cruciform or spider type body included as part of the universal joint of the present invention. Moreover, unique structural features of the universal joint overcome the long recognized disadvantages and problems of conventional universal joint structures by eliminating the need for bearing assemblies used to pivotally attach a bifurcated yoke to axially opposed trunnions.

It is well accepted that in conventional universal joints, the spaced apart outwardly extending trunnions are fixedly secured to the body. As such, the aforementioned bearing assemblies, typically comprising a plurality of needle or like bearings, are interposed between the exterior surface of the trunnion and the interior of a receiving opening formed in each of the legs of the bifurcated yoke. Relative pivotal movement between two interconnected yokes, as well as the rotary shafts with which they are associated, is facilitated concurrently to the transfer of torque as the interconnected shafts or axles is rotate.

Therefore, at least one preferred embodiment of the present invention comprises a trunnion assembly including a plurality of trunnion pins each rotationally connected to the body so as to rotate relative thereto. Further, each of the trunnion pins include an outer portion more specifically defined by a distal end protruding outwardly from the body and dimensioned and configured to engage an associated bifurcated yoke, or other external, cooperative component of the joint assembly. Interconnection between the individual trunnion pins and the corresponding bifurcated yokes is absent an interconnecting bearing assembly, as set forth above. The absence of the bearing assembly is permitted due to the rotational mounting of each of the trunnion pins relative to the cruciform or spider body.

In addition, one or more preferred embodiments of the universal joint of the present invention further includes the provision of a retaining assembly. The plurality of trunnion pins as well as the various components of the retaining assembly, to be described in greater detail hereinafter, are cooperatively disposed and structured to movably retain each of the plurality of trunnion pins in an operative position. In such an operative position the rotation of each of the trunnion pins relative to the body is readily accomplished. Each of the trunnion pins includes the aforementioned outer portion and an inner portion. The inner portion is oppositely disposed to the outer portion and is at least partially defined by an inner proximal end. Accordingly, the inner portions, including the respective proximal ends, of the plurality of trunnion pins are disposed in communicating relation to one another on the interior of the body, when the trunnion pins are in the preferred operative position.

The aforementioned retaining assembly is disposed at least partially within the body. Further, the retaining assembly is structured to movably retain each of the inner portions and/or proximal ends of the plurality of trunnion pins in their aforementioned operative positions. Inadvertent removal or radially outward displacement of any of the trunnion pins from the body is thereby prevented.

Additional features of the improved universal joint of the present invention include an at least partially hollow interior of the body. As such, the body can include an interior retaining chamber disposed and dimensioned to facilitate the collective positioning of the inner portions of the trunnion pins in communication with one another. In such a communicating position the proximal ends of the trunnion pins are movably retained by engagement with the retaining assembly. In addition, a lubricant access structure is provided such as in the form of a grease fitting. Therefore, an appropriate amount of lubricant can be forced into the interior of the retaining chamber so as to adequately lubricate the retaining assembly and the plurality of inner portions or proximal ends which are being movably retained.

In addition, the elimination of the need for an interconnecting bearing assembly between the various trunnion pins and the yokes of the interconnected rotary shafts allow the overall enlargement of an outer portion and/or distal end of each of the trunnion pins. The strength of the trunnion pins is thereby increased as well as the stability of the interconnection between the outer portion of the plurality of trunnion pins and the associated bifurcated yokes.

Yet additional structural features in at least one preferred embodiment of the present invention comprises the inclusion of reinforced segments or portions of the body primarily extending between the adjacently positioned trunnion pins. Such reinforcement of the body serves to eliminate or significantly restrict the possibility of flexure between spaced apart, adjacent ones of the trunnion pins. Such flexure is a substantially common occurrence in conventionally structured universal joints operating under high stress conditions.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As shown in the accompanying Figures, the present invention is directed to a universal joint assembly generally indicated as 10. The universal joint assembly 10 comprises a cruciform or spider body, generally indicated as 12 and a trunnion assembly including a plurality of trunnions 14, 15, 16, and 17. A unique and distinguishing feature of the universal joint assembly 10 of the present invention is the elimination of any type of bearing assembly, such as an array of needle bearings, used to interconnect the yokes of rotationally connected shafts to corresponding ones of the trunnion pins. As set forth above, elimination of the aforementioned conventionally used bearing assemblies, overcomes significant problems and disadvantages associated with the manufacture and use of conventional universal joints.

As should be obvious, the universal joint assembly 10 is of the type used to interconnect two bifurcated yokes secured to or associated with connected rotary axles or shafts (not shown for purposes of clarity). When so connected using the universal joint assembly 10, the interconnected yokes are pivotally or angularly movable relative to one another concurrently to the transfer of rotary force or torque between the attached rotary shafts. The aforementioned bifurcated yokes, also referred to herein as cooperative exterior components of the joint assembly, can be of the type which conventionally include spaced apart legs having receiving openings or apertures formed therein for placement of the individual trunnion pins 14 through 17.

Figure 1:
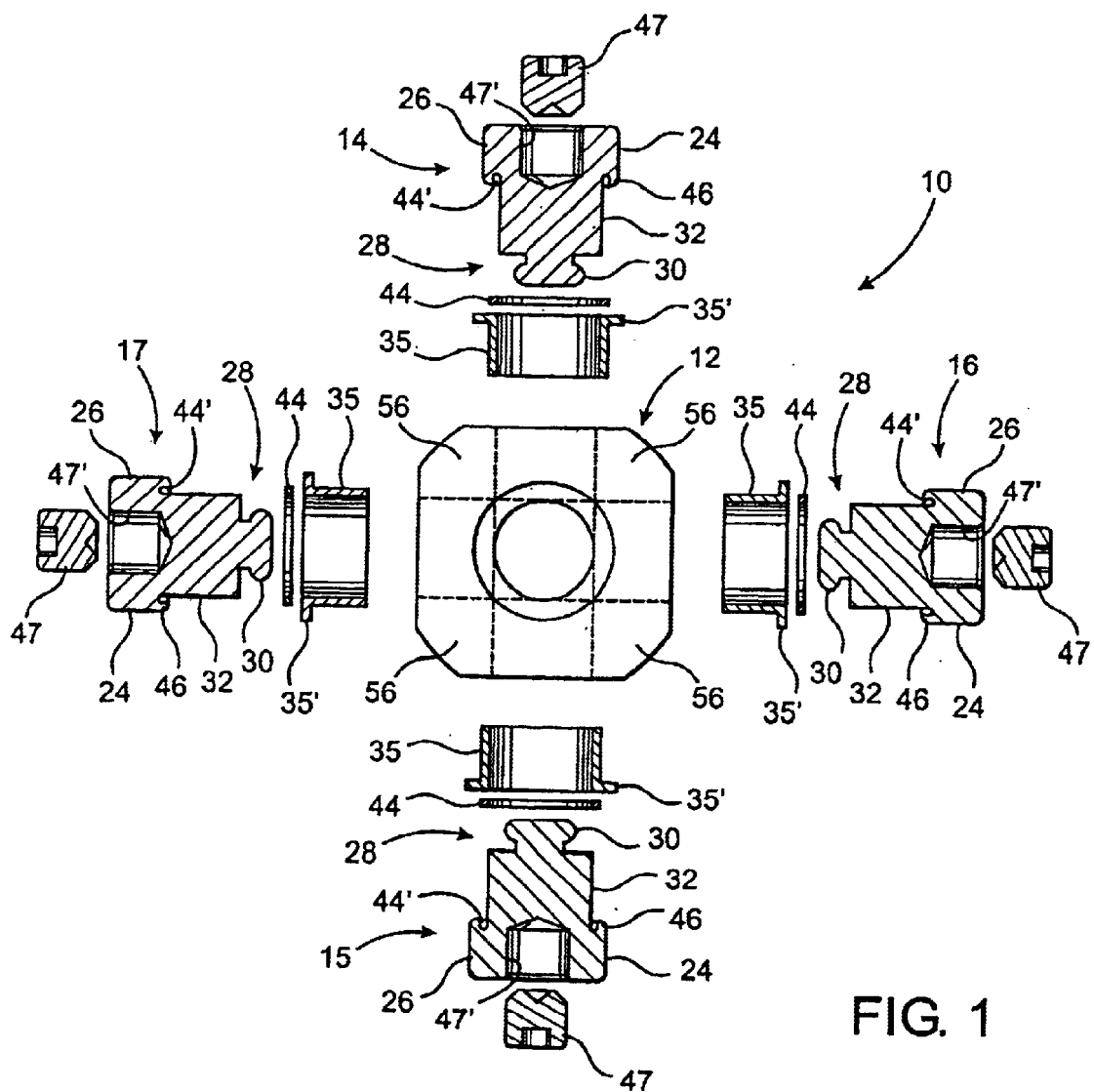
FIG. 1 is a front exploded view in partial section of a universal joint assembly of the present invention in unassembled form.

More specifically, and in the preferred embodiment of FIG. 1, the trunnion pins 14 through 17 are collectively located in an orthogonal array, such that pairs of the trunnion pins 14, 15 and 16, 17 are axially aligned. Each pair of aligned trunnion pins 14, 15, and 16, 17 are connected to different ones of the aforementioned, bifurcated yokes. Rotational mounting or connection of the plurality of trunnion pins 14 through 17 is accomplished through the provision of the body 12 having an at least partially hollow interior. Such a hollow interior structure is at least partially defined by the body 12 including a plurality of bores 18, 19, 20 and 21. The outer end of each of the bores 18 through 21 terminate in an open end, respectively indicated as 18', 19' 20' and 21'. The trunnion pins 14 through 17 pass into the corresponding bores 18 through 21, through the respective openings thereof. Moreover, each of the bores 18 through 21 communicate at their inner end with a retaining chamber 22, as clearly shown in the at least partially assembled embodiment of FIG. 3.

Figure 3:
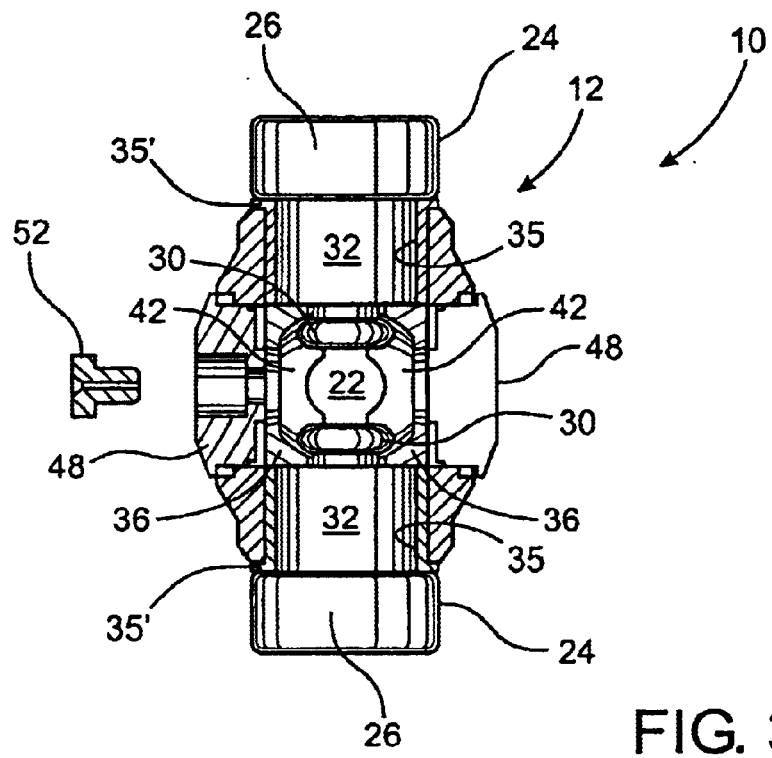
FIG. 3 is a side view in partial section of the preferred embodiment of FIGS. 1 and 2 in partially assembled form.

Accordingly, each of the trunnion pins 14 through 17 include an outer portion 24 comprising an enlarged distal end 26, which may be integrally or otherwise fixedly secured to a remainder of the respective trunnion pins 14 through 17. Also, each of the trunnion pins 14 through 17 include an inner portion generally indicated as 28 which comprises a proximal end 30. As also shown in FIG. 3, the interconnecting and preferably integrally secured remaining portion 32 of each of the trunnion pins 14 through 17 extends between the distal end 26 and the proximal end 30. The remaining or intermediate portion 32 may also be considered an inner portion due to its positioning on the interior of the housing 12, when each of the plurality of trunnion pins 14 through 17 are assembled in an intended, operative position of FIG. 3.

Rotation of each of the trunnion pins 14 through 17 relative to the body 12 is further facilitated by the provision of a plurality of bushings 35 each disposed, such as by press fitting, into a different one of the bores 18 through 21. The bushings 35 are disposed in sandwiched relation between the inner surface of the respective bore 18 through 21 and the intermediate portion 32 of the corresponding trunnion pin 14 through 17, as also disclosed in the assembled embodiment of FIG. 3. Further, each of the bushings 35 includes a fixedly or integrally secured flange or collar 35' on the outer most end thereof. Although not clearly represented in FIG. 3, each of the plurality of bushing flanges 35' are disposed between the corresponding surface or portion of body 12 and an under cut area 46, located between the intermediate portion 32 and the distal end 26 of the outer portion 24 of each of the trunnion pins 14 through 17. In addition to the above, o-ring members 44 are disposed adjacent the undercut 46 and preferably within annular grooves or channels 44'. Therefore, cooperative dimensioning of the plurality of bores 18 through 21, plurality of bushings 35 and plurality of trunnion pins 17 through 21, facilitates a reciprocal, rotational movement between the trunnion pins 14 through 17 and the body 12. Such rotational movement is necessary for efficient, movable interconnection of the shafts joined by the universal joint 10 of the present invention.

Figure 4:
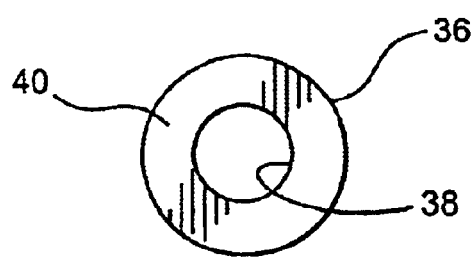
FIG. 4 is a front view of an exterior surface of a component of a retaining assembly associated with the preferred embodiment of FIGS. 1 through 3.
Figure 5:
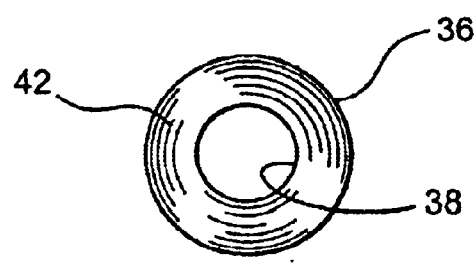
FIG. 5 is a rear view of the preferred embodiment of FIG. 4.

Another structural feature of the preferred embodiment of the present invention is the provision of a retaining assembly. The retaining assembly is mounted on the interior of the body 12 in retaining engagement with the inner portions 28 and specifically the proximal ends 30 of each of the trunnion pins 14 through 17. The retaining assembly comprises a race assembly including at least one but preferably a plurality of retaining race members 36. With reference to FIGS. 4 and 5, each of the retaining race members 36 includes a substantially annular configuration with at least one having a central pass through aperture or opening 38 disposed in communicating relation between an outer surface 40 and an inner surface 42.

Figure 2:
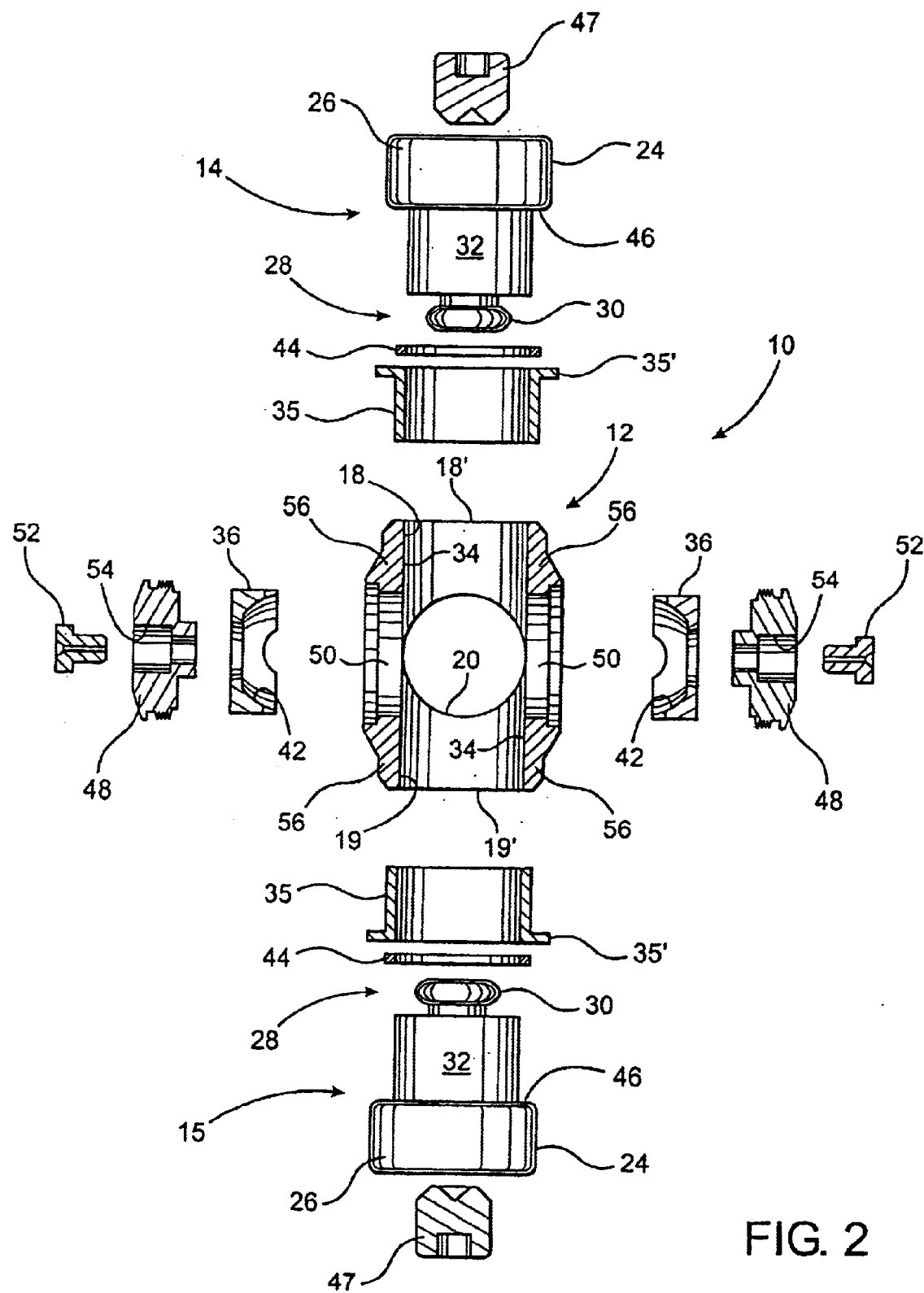
FIG. 2 is a side exploded view in partial section of the preferred embodiment of FIG. 1 in unassembled form.

As shown in FIGS. 2, 3 and 5, the interior surface 42 of each race member 36 has an inwardly recessed bevel being correspondingly dimensioned and configured to movably receive and retain the plurality of proximal ends 30 of each of the trunnion pins 14 through 17. As such, each of the proximal ends 30 includes an outwardly extending, cooperatively disposed surface about the continuous periphery thereof which rotationally engages the inner surface 42. The plurality of race members 36 and the disposition of each of the proximal ends 30 of the inner portions 28 are substantially disposed within the retaining chamber 22. Such communicating disposition with one another within the chamber 22 serves to movably retain the trunnion pins 14–17 as they rotate relative to the body 12 in their respective operative positions. Such retaining engagement and positioning of the trunnion pins 14 through 17 prevents their axial movement outwardly from the respective bores 18 through 21.

It should be recognized that in the partially assembled, sectional view of FIG. 3 only the axially aligned trunnion pair 14, 15 are shown in their movably retained, operative position by virtue of the rotational engagement of the respective proximal ends 30 with the spaced apart race members 36. However, it is noted that while the cooperative trunnion pair 16, 17 are not represented in FIG. 3, their respective proximal ends 30 are also disposed in rotational engagement with the interior surfaces 42 of the plurality of race member 36, concurrently to the distal ends 30 of the trunnion pin pair 14, 15.

Further at least one preferred embodiment of the universal joint assembly 10 includes a closure assembly having at least one, but preferably a plurality of, closure and/or retaining caps 48. Each of the retaining caps 48 are disposed in overlying, containing relation to respective ones of the retaining race members 36 as best shown in FIG. 3. The retaining caps or closures 48 are received within openings 50 also formed within the body 12. The openings 50 extend into communicating relation with the orthogonally oriented bores 18 through 21. By virtue of this positioning, the retaining caps 48 serve to maintain the plurality of race members 36 in their retaining engagement with the proximal ends 30 associated with each of the plurality of trunnion pins 14 through 17.

Further, in order to reduce the build up of heat because of the rotational engagement of the proximal ends 30 with the interior surface 42 of the plurality of race members 36, the receiving or retaining chamber 22 may be supplied with an appropriate an adequate amount of lubricant. As such, lubricant is forced through a grease fitting or like structure 52 mounted within compartment 54 of at least one of the retaining caps 48. Lubricant is thereby supplied into the interior of the chamber 22 so as to adequately lubricate the plurality of proximal ends 30 of each of the trunnion members 14 through 17 as they are collectively and cooperatively disposed into retaining engagement with the plurality of race member 36.

Another structural feature of the preferred embodiment of the universal joint assembly 10 comprises an enlargement of the proximal ends 26 comprising the outer portion 24 of each of the trunnion pins 14–17. Because of the elimination of any interconnecting bearing assemblies between the outer portions 24 and the bifurcated yokes to which they are attached, the outer portion 24 and the distal end 26 may be integrally enlarged so as to "fill" the space normally occupied by the aforementioned interconnecting bearing assemblies. This in turn serves to further strengthen and stabilize the individual trunnion pins 14 through 17 as well as their connection to the corresponding bifurcated yokes, as explained above. Also, set screws 47 may be mounted within recesses 47' or otherwise attached to the plurality of trunnion pins 14 through 17 in order to facilitate mounting or connection thereof.

Yet another structural feature of at least one preferred embodiment of the present invention is the provision of a plurality of reinforced portions or segments 56. Segments 56 are integrally formed on the body 12 particularly, but not exclusively, between spaced apart and next adjacent ones of the plurality of trunnion pins 14 through 17. The reinforced segments 56 are more specifically defined by radially outward protruding, integral portions of the body, extending between the spaced apart but next adjacent bores 18, 20; 20, 19; 19, 21; and 21, 18. The radially outwardly extending or protruding reinforced segments 56 serve to eliminate or significantly restrict flexure of the body 12 between the adjacent trunnion pins, such as when the universal joint assembly 10 is operating under severe stress conditions. Such flexure is a known occurrence in conventionally structured universal joints. As will be noted, such conventional structure may include a u-shape or somewhat concave recessed portion extending between the spaced apart but adjacent trunnions which are fixed to the respective cruciform or spider bodies.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A universal joint assembly comprising:
   a) a body including an at least partially hollow interior,
   b) a trunnion assembly including at least one trunnion pin having an inner portion disposed within said body and an outer portion extending outwardly from said body, and
   c) said trunnion pin rotationally connected to said body;
   d) a retaining assembly at least partially mounted within said body and disposed and structured to retain said trunnion pin in an operative position on said body; and
   e) said retaining assembly including at least one race member disposed within said body, said inner portion of said trunnion pin including a proximal end disposed in rotational engagement with said race member in said operative position.

2. A universal joint assembly as recited in claim 1 wherein said outer portion comprises an enlarged distal end correspondingly dimensioned and connected to a cooperative exterior component of said universal joint assembly.

3. A universal joint assembly as recited in claim 2 wherein said inner portion comprises a proximal end disposed and structured to be movably retained within said body.

4. A universal joint assembly as recited in claim 1 wherein said trunnion assembly comprises a plurality of said trunnion pins disposed on said body in predetermined spaced relation to one another, each of said trunnion pins rotationally connected to said body.

5. A universal joint assembly as recited in claim 4 wherein each of said plurality of trunnion pins includes said inner portion disposed within said body and an outer portion extending outwardly from said body.

6. A universal joint assembly as recited in claim 5 wherein said body includes an interior chamber and a plurality of bores, each of said bores disposed in communicating relation between said interior chamber and an exterior of said body.

7. A universal joint assembly as recited in claim 6 wherein each of said plurality of trunnion pins are rotationally mounted within a different one of said bores and are dimensioned to position said inner portions thereof in communicating relation with said interior chamber.

8. A universal joint assembly as recited in claim 7 wherein said retaining assembly is at least partially disposed within said interior chamber in retaining relation to said inner portions of said plurality of trunnion pins.

9. A universal joint assembly as recited in claim 8 wherein said race member is disposed in communicating relation with said interior chamber, said inner portion of at least some of said trunnion pins rotationally engaging said race member.

10. A universal joint assembly as recited in claim 4 wherein said race member is disposed in retaining relation with at least some of said plurality of trunnion pins.

11. A universal joint assembly as recited in claim 10 wherein said inner portion of each of said plurality of trunnion pins rotationally engage said race member.

12. A universal joint assembly as recited in claim 4 wherein said retaining assembly comprises a plurality of said race members collectively disposed to movably retain said plurality of trunnion pins in an operative position on said body.

13. A universal joint assembly as recited in claim 12 wherein said operative position comprises an inner portion of said plurality of trunnion pins rotationally engaging said plurality of race members.

14. A universal joint assembly as recited in claim 1 wherein said body comprises a plurality of reinforced segments each extending in interconnecting relation between different ones of said plurality of bores.

15. A universal joint assembly as recited in claim 14 wherein each of said reinforced segments protrude radially outward between said different ones of said plurality of trunnion pins, whereby flexure of said body between adjacently positioned trunnion pins is restricted.

16. A universal joint assembly as recited in claim 1 wherein said retaining assembly further comprises a closure assembly secured to said body and including a lubricant access structure, whereby lubricant can be introduced into said the interior of said body.

17. A universal joint assembly as recited in claim 6 further comprising a bushing disposed between each of said plurality of trunnion pins and an interior surface of a corresponding one of said plurality of bores.

18. A universal joint assembly as recited in claim 17 wherein each of said bushings includes a flange disposed between said body and said outer portion of each of said plurality of trunnion pins.

* * * * *